United States Patent [19]
Gendreu et al.

[11] 3,794,901
[45] Feb. 26, 1974

[54] DEVICE FOR IMPARTING AN ALTERNATING ROTARY MOTION TO A BODY, ABOUT A MECHANICAL AXIS

[75] Inventors: Robert Gendreu; Serge Platel, both of Paris, France

[73] Assignee: Thomson-CSF, Paris, France

[22] Filed: Sept. 8, 1972

[21] Appl. No.: 287,482

[30] Foreign Application Priority Data
Sept. 14, 1971  France ............................. 7133073

[52] U.S. Cl. .............................. 318/627, 318/282
[51] Int. Cl. ............................................. G05g 5/00
[58] Field of Search ................... 318/282, 627, 626

[56] References Cited
UNITED STATES PATENTS

| | | | |
|---|---|---|---|
| 2,767,363 | 10/1956 | Chubb | 318/282 X |
| 3,541,419 | 11/1970 | Jansons | 318/627 |
| 3,166,699 | 1/1965 | Dalzell | 318/627 |
| 3,532,957 | 10/1970 | Mettert | 318/627 |
| 3,665,282 | 5/1972 | Skehan | 318/627 |

*Primary Examiner*—B. Dobeck
*Attorney, Agent, or Firm*—Cushman, Darby & Cushman

[57] ABSTRACT

To a body, imparted in alternating rotary motion about a mechanical axis attached to a fixed support, by a motor, there are fixed the ends of springs whose respective other ends are connected to said fixed support. The springs restore, in the form of kinetic energy, the stored potential energy; the energy to be supplied by the motor in order to sustain the motion, is limited to that required to compensate for friction losses. An angle detector supplies a control signal from a negative feedback loop in the motor supply, the motor supply also comprising an ordinary feedback or reaction loop.

5 Claims, 3 Drawing Figures

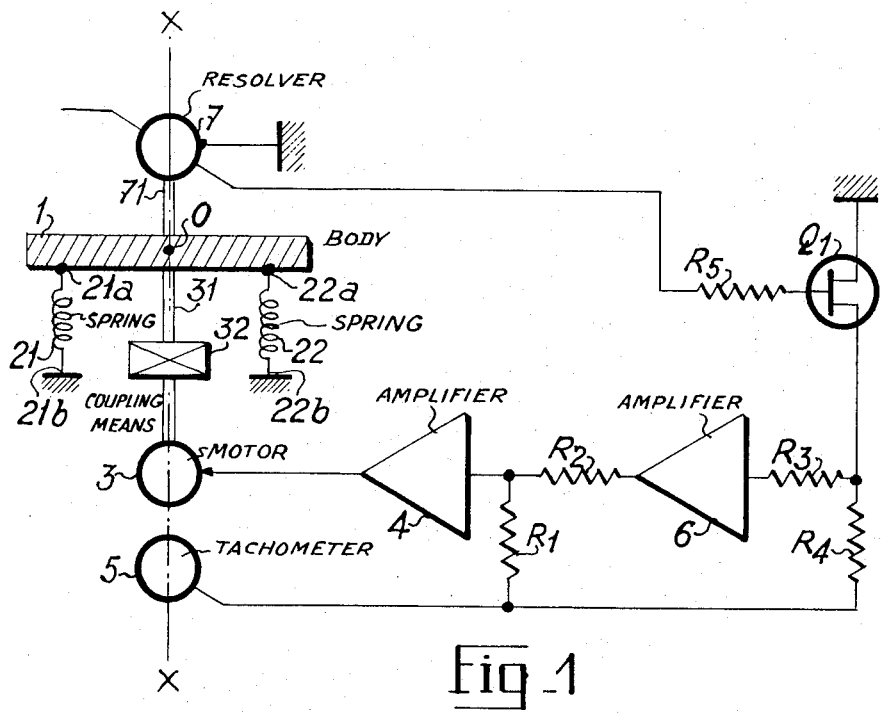
Fig_1
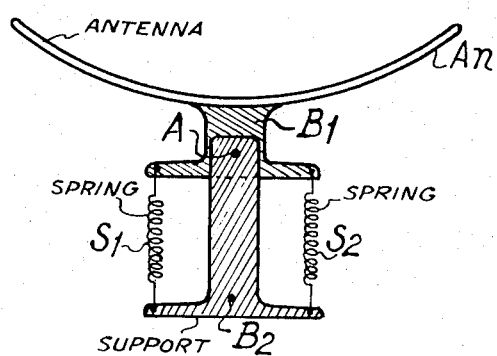
Fig_2

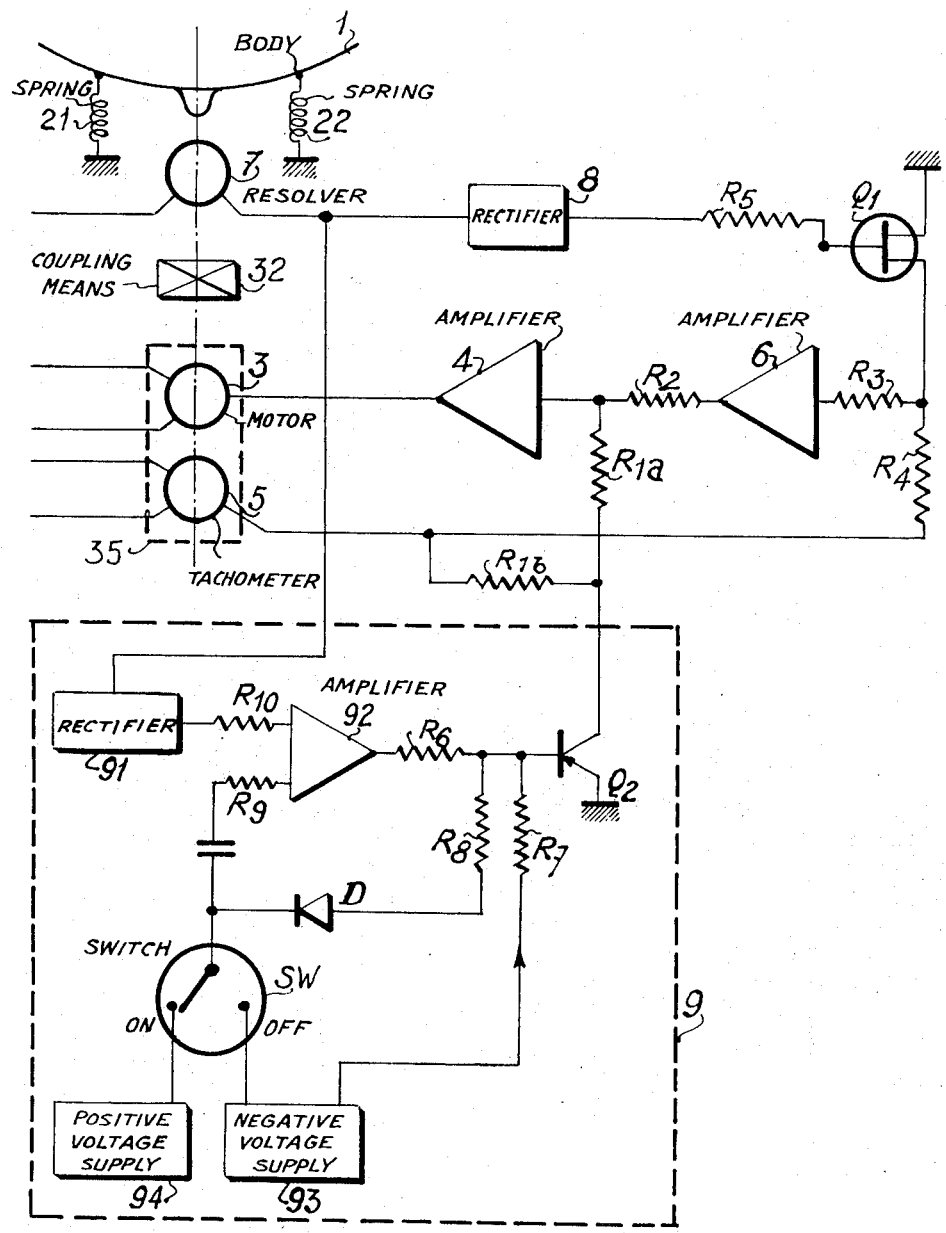
Fig_3

DEVICE FOR IMPARTING AN ALTERNATING ROTARY MOTION TO A BODY, ABOUT A MECHANICAL AXIS

The present invention relates to a device for imparting to a body having a known mass, an alternating rotary motion about a mechanical axis linked with a fixed support, the amplitude and frequency characteristics of this motion being predetermined.

The known devices comprise devices for driving said body, which incorporate a motor, a device coupling said motor to said body, and a control circuit for said motor.

The motor can be used which has a high torque, at least equal to the reaction torque of the mechanical mass of the body, for the motion concerned, but this means using a motor which is the heavier and more bulky the greater the mass of the body.

It is also possible to use a mechanical crank and connecting rod system driven by a motor with a flywheel, this making it possible to operate the motor at constant torque but leading to a bulky and unreliable arrangement.

The system in accordance with the invention has none of the aforesaid drawbacks.

In accordance with one feature of the invention, in order to create an oscillatory device for sustained and controlled oscillation, means are provided for the conversion of potential energy to kinetic energy and vice-versa, which means are connected on the one hand to said body and on the other to said fixed support, and means for sustaining and controlling said motion, which means comprise on the one hand a detector detecting the angular velocity of said body and, in the control circuit of said motor, a reaction loop coupled to said velocity detector, and on the other hand a detector for detecting the angular position of said body and, in the control circuit of said motor, a negative feedback loop coupled to said positional detector and to said velocity detector.

This system is particularly appropriate for driving bodies having a substantial mass, because the motor power is not directly linked to the magnitude of the driven mass. The movement can be controlled, in accordance with the invention, by controlling the power supplied by the motor.

The invention will be better understood from a consideration of the following description and figures relating thereto in which:

FIG. 1 is a diagram of a drive system in accordance with the invention;

FIG. 2 illustrates an example of the application of the invention and

FIG. 3 is an example of how an antenna may be driven in accordance with the invention.

In the diagram shown in FIG. 1, the element being driven, 1, has been represented in the form of a parallelepiped in order to simplify matters. It goes without saying, however, that the shape is a matter of arbitrary choice; in this example, the axis O (seen on end), around which the body 1 is to execute an alternating motion, passes through the body 1; however, this is by no means a limiting condition.

Since the motion is an alternating rotary motion about an axis, there is a plane of symmetry of motion, which passes through the axis of rotation. In the case shown in the FIG., this plane is the one marked by the line XX. Energy recovery elements, represented here in the form of helical springs 21 and 22, are arranged at either side of this plane. They each have one end, (21a, 22a) fixed to the element and one end (21b, 22b) fixed to a stationary support. The elements 21 and 22 can take any other desired form (linear springs, spiral springs, torsion bars, elastic supports) provided that they possess the essential property of being able to store a substantial amount of potential energy within a small volume and release it, with high efficiency, in the form of kinetic energy. The coupling of the elements 21 and 22 to the body 1 being driven, depends upon the shape of the latter; it should in all cases be effected so that said elements can exert a restoring torque on the body in relation to the axis of rotation, during the motion. In this system, the return springs 21, 22 and the body 1, constitute a mechanical resonator of high quality factor. Once the motion has been started, therefore, a motor of low power will suffice to maintain it, since the motor only has to transmit to the body 1 the small quantity of energy which is lost by friction with each cycle of oscillation. This motor, illustrated at 3, is coupled to the body 1 in order to produce the desired motion. In FIG. 1, which is simply a highly generalised diagram, this coupling has been symbolised by the double line 31 and the reduction gear 32, the latter although often useful is, not indispensible in principle.

The motor 3 is controlled by the output voltage from the amplifier 4 to whose input there is reaction-coupled, for example across the resistor $R_1$, the output of a tachogenerator 5 driven by the motor (the source supplying the inductors of the generator has not been illustrated, simply in order to avoid overburdening the FIG.). More generally, the tachogenerator can be replaced by any device which supplies a voltage that is a function of the speed of the driven body or (which comes to the same thing) of the motor (for example a device measuring the back-e.m.f. of the motor). This reaction suppresses the system damping, and, as stated hereinbefore, the assembly constitutes a system which oscillates at a frequency determined as a function of the mass 1 and the stiffness of the springs 21 and 22.

However, although in the case of FIG. 1 the amplitude of the motion is limited by the springs 21 and 22, in fact, since these springs must not be operated beyond their elastic limit, it is necessary to provide some means of controlling the amplitude of the motion. This control is achieved by regulating the control signal supplied to the motor. To this end, the output of the tachogenerator 5, is coupled by negative feedback to the input of the amplifier 4, for example through the medium of the negative gain amplifier 6 and resistors R2 and R3, R4; control of the negative feedback can be effected, for example, by utilising the variable resistance effect of a field-effect transistor Q1 on the divider bridge constituted by the resistors R3, R4, the control electrode of the transistor being coupled, through the resistor R5, to the output of a device 7 which measures the angular position of the body 1 (for example an electrical, magnetic or optical position detector). If the absolute value of the angle measured by the device 7 increases, the bias voltage applied to the transistor Q1 across the resistor R5 has the effect of increasing the level of the tachogenerator signal applied to the input of the amplifier-inverter 6, and, since it thus increases the braking effect on the system, ensures that the selected amplitude is not exceeded.

The double line 71 symbolically illustrates the coupling of the angle-measuring device 7 to the body 1 being driven, this coupling being effected in any appropriate known manner (mechanical, electrical, optical coupling... ).

The invention can be employed in particular for the driving of an antenna or antenna element, for example for driving the antenna reflector marked An in FIG. 2 and shown in section in a plane of symmetry. In this example, the reflector is fixed to a support B1 movable about a shaft A assembled on a fixed support B2 to which the springs S1 and S2 are attached, these springs being on the other hand attached to the support B1. The motor 3 of FIG. 1 is coupled to the shaft A whose axis is coincidental with the axis 0 of FIG. 1.

FIG. 3 is an example of a system in accordance with FIG. 1, applied to the driving of an antenna.

In this figure, the references utilised in FIG. 1 have been used once again to indicate elements having the same functions as those similarly marked in FIG. 1.

The case taken here is that of an antenna having a moment of inertia of 0.2 m$^2$/kg, which is to perform a space scan function within a sector of $\pm 35°$ at a scan frequency of 3 cycles/second. To this end, coil-wound helical springs are used, designed as a function of the antenna inertia to give the assembly an actual frequency of oscillation of 2 cycles/second. The motor 3 and the tachogenerator 5 constitute a single assembly 35 supplied with two-phase current at a frequency of 400 c/s, for example an assembly of the SAGEM 24.15 MG type. The resistor R1 in the feedback loop of the fundamental diagram, is here made up of two elements R1a and R1b. A THOMSON-CSF R4LF selsyn supplied with a reference voltage at 400 c/s, is utilised as the angle-measuring device 7: a rectifier and filter circuit 8 is therefore provided between the selsyn and the transistor Q1, to bias the latter (direct voltage). The negative feedback loop effects automatic amplitude control comparable, in principle, to the automatic gain control used in radio receivers. Another solution would be to compare the output voltage from the position detector, with a reference voltage. The difference between these two voltages would, after shaping, regulate the power supplied by the motor. Here, in addition to the fundamental circuits described and explained making reference to FIG. 1, there is a circuit 9 which is a safety and starter circuit; this circuit comprises as its essential element a transistor Q2 utilised as a controlled resistor, in shunt across the feedback loop. The transistor's emitter earthed and its collector coupled to the junction between the resistors R1a and R1b. In the case shown in the figure, the transistor is short-circuited when its base is negatively biased. In this case, the feedback loop is open circuited Through this arrangement, the base of the transistor controls the switching into and out of circuit the resolver 7, on the one hand automatically in order to protect the system, and on the other hand through controlled switching in order to effect starting and controlled stopping. To this end, the output of the selsyn 7 is coupled, after rectification at 91, through a resistor R10 to one of the inputs of an operational amplifier 92 whose output is coupled to the base of the transistor through the resistor R6. Between the latter and the base there are connected on the one hand a resistor R7 whose other terminal is maintained at a negative potential of −12 volts, and on the other hand a resistor R8 in series with a diode D. In the "rest" position, the cathode of this diode is maintained at a negative potential produced by the voltage source 93. This circuit disconnects the motor feedback loop in the event that the selsyn breaks down, since without this facility control of the amplitude of the motion would disappear and the antenna could be damaged. The operation of this circuit is as follows In normal operation, the base of the transistor Q2 is positively biased through the medium of the amplifier 92 and the resistor R6, and the motor reaction loop operates normally. In the event of a failure, the output voltage of the selsyn 7 is zero so that the output voltage from the amplier is zero too and the transistor Q2, whose base is negatively biased across via the resistor R7, short-circuits said feedback loop to earth, inhibiting any oscillation.

The stopping and restarting of the motion are effected by means of the switch SW whose output is coupled to the junction between the diode and the capacitor aforementioned, the two inputs being coupled in the one case (OFF position) to a negative voltage source 93, in the other (ON position) to a device 94 supplying a positive voltage of at least 12 volts. If the switch is placed in the OFF position, the negative bias to the base of the transistor Q2 is increased, cancelling the motor reaction. When the switch is in the ON position, a positive pulse is applied across capacitor C and the operational amplifier produces temporary positive bias: the motor feedback loop then functions and a positive voltage thus appears at the output of the selsyn so that consequently a positive voltage appears at the base of the transistor Q2 (when the positive starting pulse is terminated, since the capacitor C only passes transitory signals, the direct voltage 94 results in only one pulse), the oscillation of the circuit thus being sustained. Once started, the movement is amplified by resonance and, too, the power required for starting is relatively small compared with that required in conventional systems.

What we claim is:

1. A device for imparting an alternating rotary motion to a body about a mechanical axis attached to a fixed support, said device comprising means including a motor for driving said body, a device coupling said motor to said body and a motor control circuit, means for converting potential energy into kinetic energy and vice-versa, said means being connected between said body and said fixed support, and means for sustaining and controlling said motion which comprise a first detector for detecting the angular velocity of said body, a feedback loop in the motor control circuit and coupled to said velocity detector, a second detector for detecting the angular position of said body, a negative feedback loop in the motor control circuit coupled to said position detector and to said velocity detector, and safety means shunted across said feedback loop and coupled to said position detector.

2. A device as claimed in claim 1 wherein said negative feedback loop comprises a field-effect transistor (Q1) and a negative voltage source, said field-effect transistor being used as a variable resistor, the resistance of which is a function of its bias, said field-effect transistor being coupled by its gate electrode to said negative voltage source and to the output of said position detector.

3. A device as claimed in claim 1, wherein said safety means comprises a transistor (Q2) utilized as a controlled resistor, said transistor shunted across said feedback loop, its base being coupled to said position detector.

4. A device as claimed in claim 3, wherein a circuit controlling the starting or stopping of the motion of said body, comprises means for applying to the base of the transistor (Q2) either a pulse blocking said transistor for purpose of starting or a direct voltage which causes said transistor to conduct.

5. A device as claimed in claim 4, wherein said circuit comprises a direct voltage source, a resistor (R8) and a diode (D) coupled in series between the base of the transistor (Q2) and said direct voltage source.

* * * * *